(No Model.) 6 Sheets—Sheet 1.
G. W. C. LOMB.
ELECTRIC RAILWAY.
No. 575,303. Patented Jan. 12, 1897.
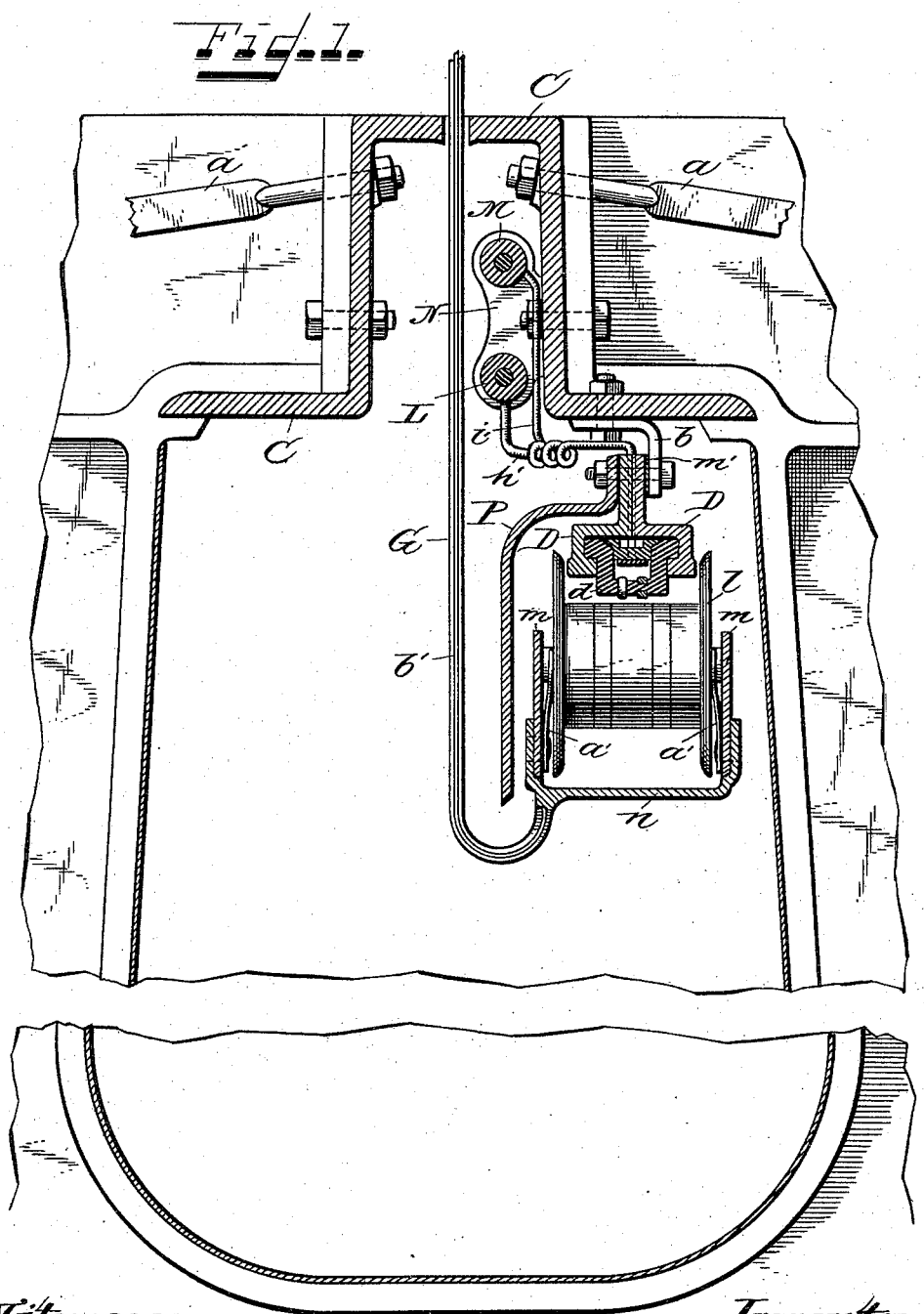
Witnesses. Inventor.
George W. C. Lomb
by Stem & Allen
Attorneys.

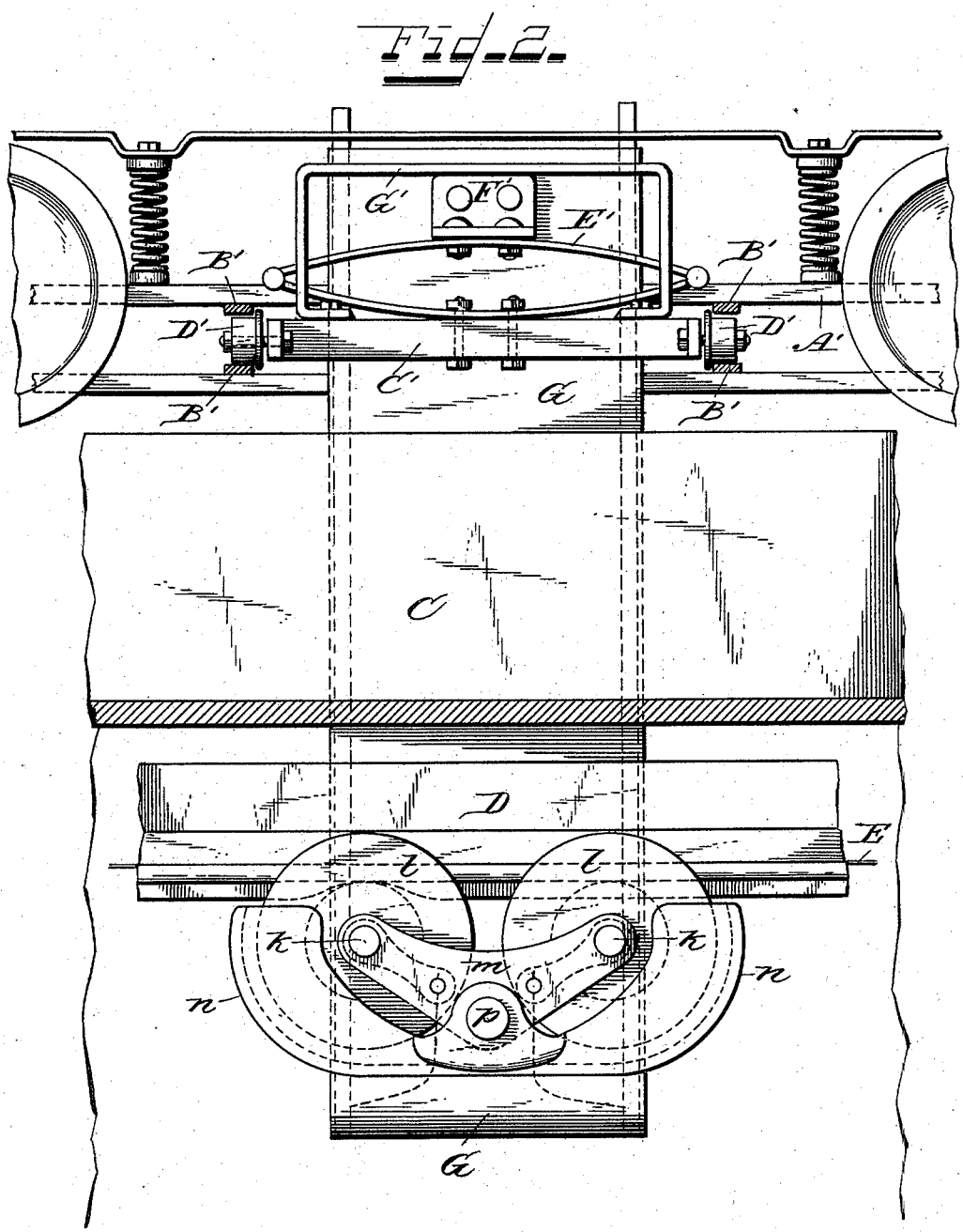

(No Model.)  6 Sheets—Sheet 3.
G. W. C. LOMB.
ELECTRIC RAILWAY.
No. 575,303. Patented Jan. 12, 1897.
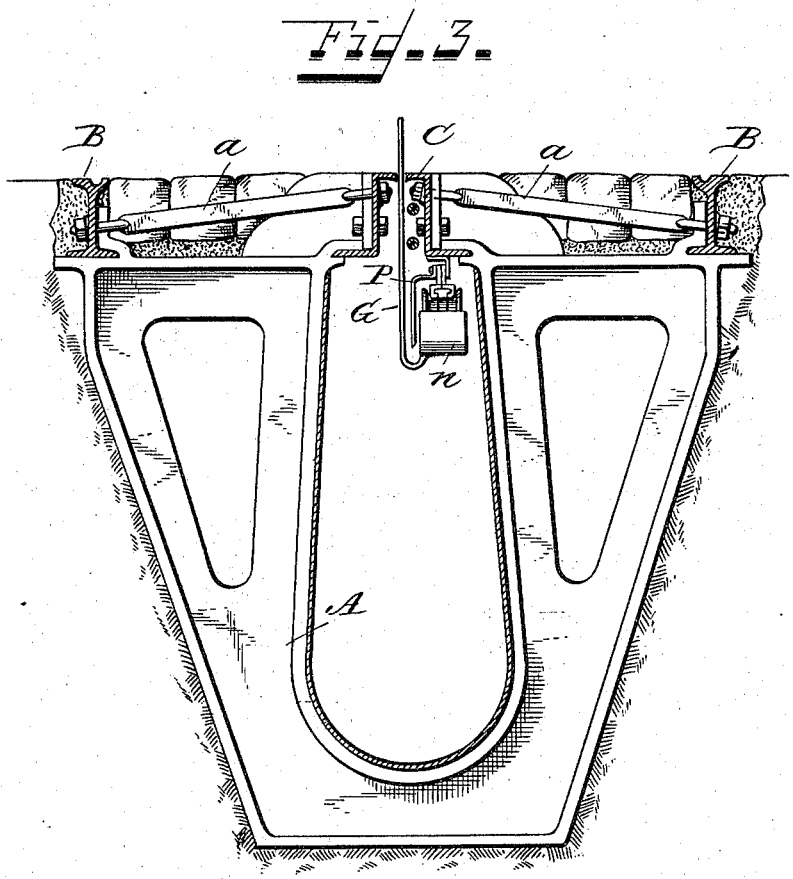
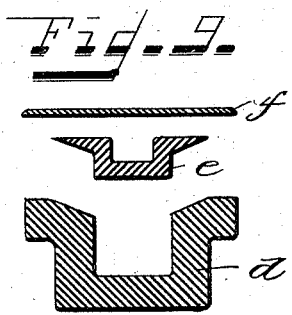
Witnesses.
J. Thomson Cross
George Heidman
Inventor
George W. C. Lomb
by Stem & Allen
Attorneys.

(No Model.)  G. W. C. LOMB.  6 Sheets—Sheet 4.
ELECTRIC RAILWAY.
No. 575,303.  Patented Jan. 12, 1897.
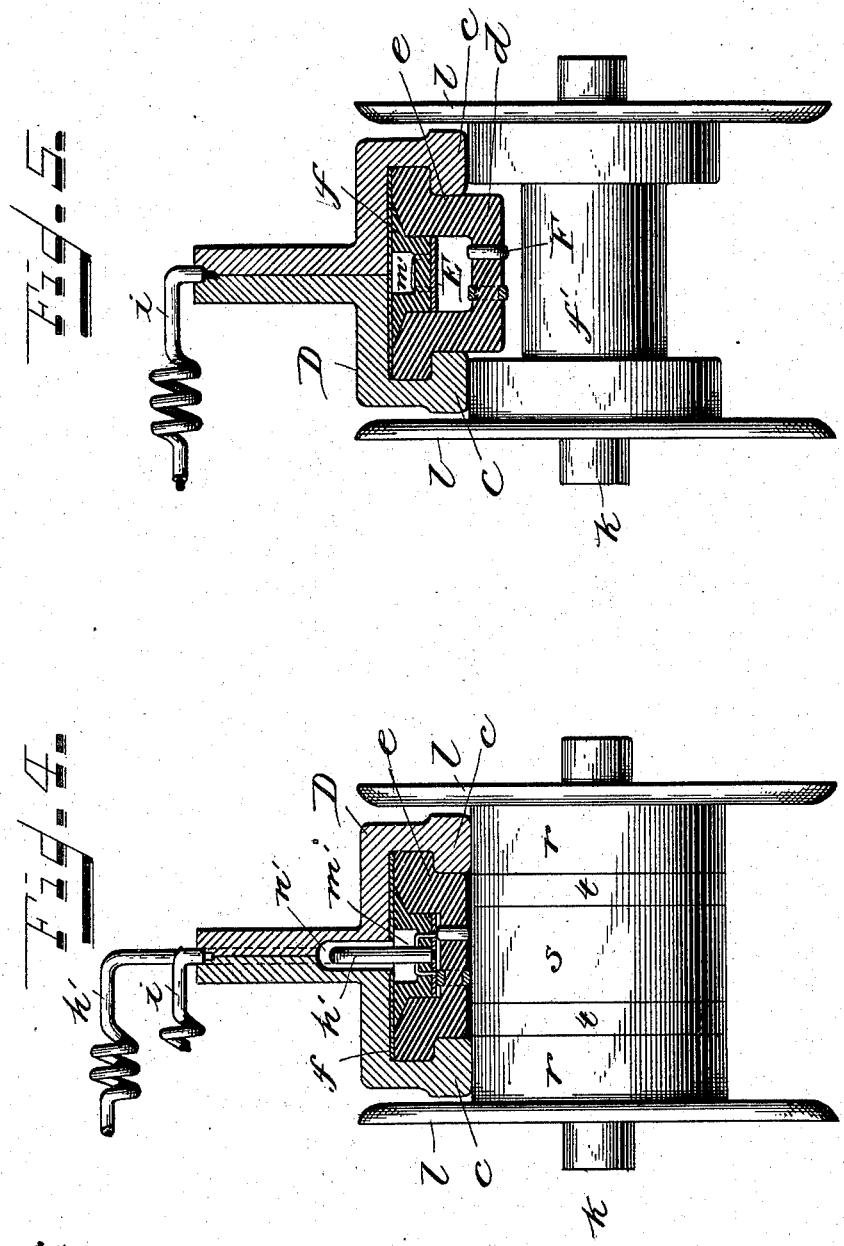

(No Model.) 6 Sheets—Sheet 5.
G. W. C. LOMB.
ELECTRIC RAILWAY.
No. 575,303. Patented Jan. 12, 1897.
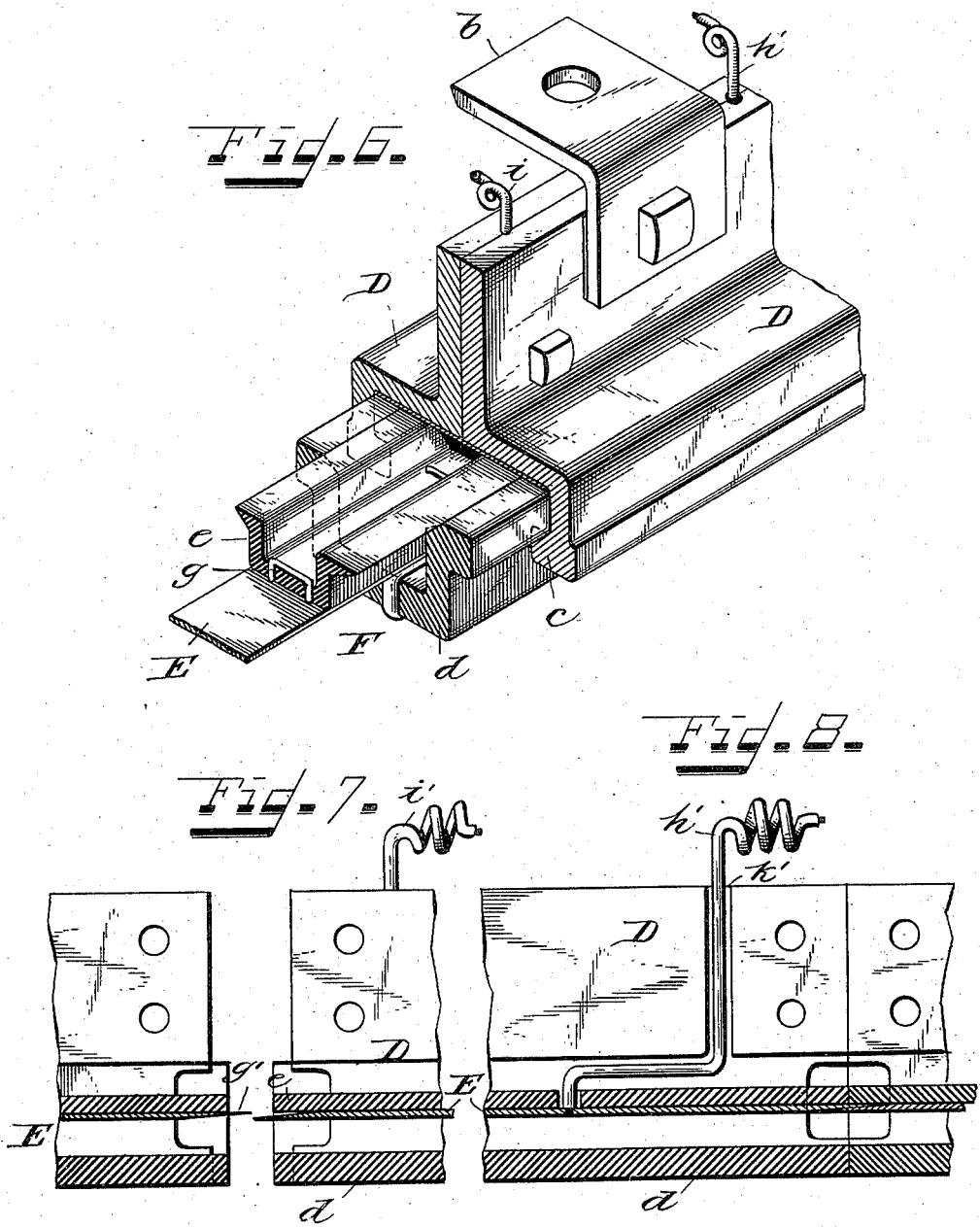
Witnesses.
J. Thomson Cross
George Heidman
Inventor
George W. C. Lomb
by Stern Allen
Attorneys.

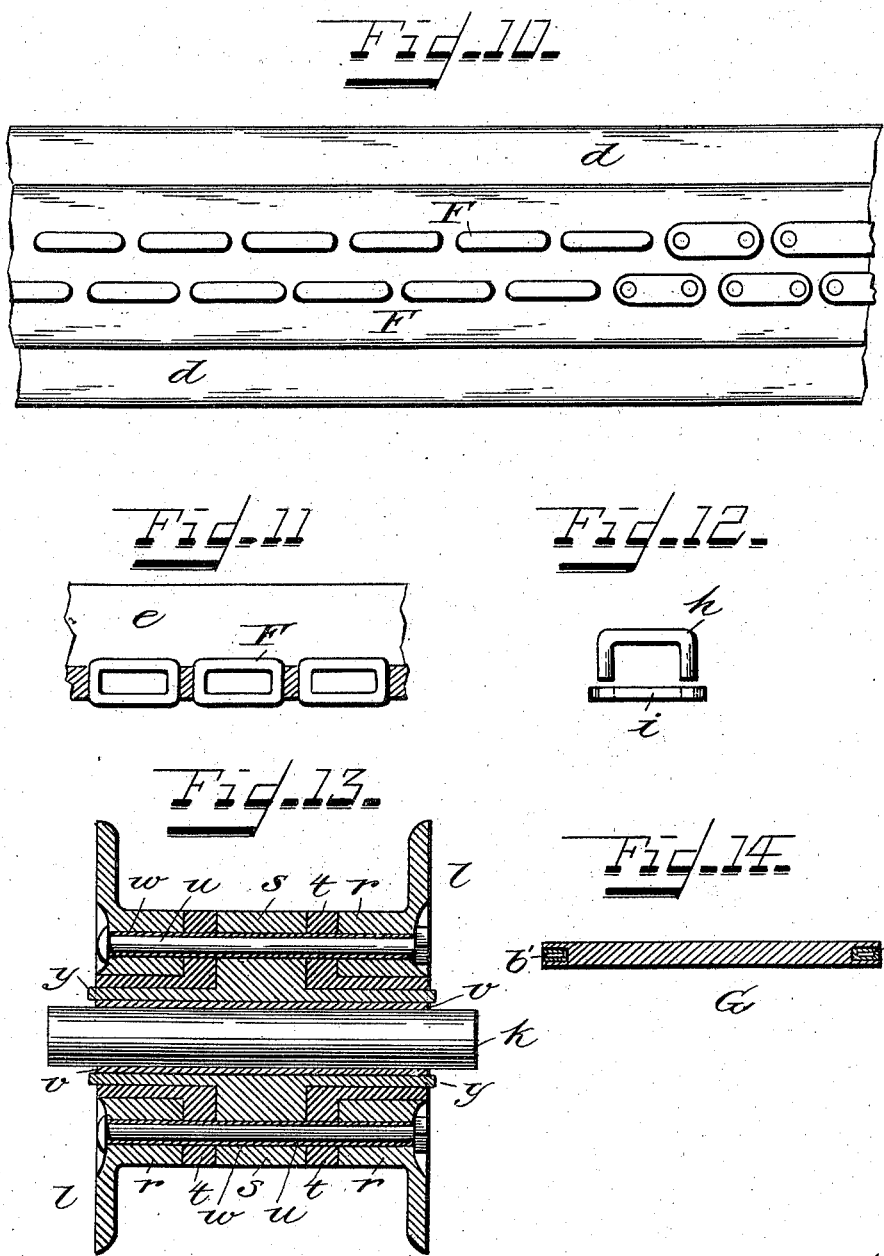

UNITED STATES PATENT OFFICE.

GEORGE W. C. LOMB, OF BIRMINGHAM, ALABAMA, ASSIGNOR OF ONE-FOURTH TO ADDISON BALLARD, OF HALLETSVILLE, TEXAS.

ELECTRIC RAILWAY.

SPECIFICATION forming part of Letters Patent No. 575,303, dated January 12, 1897.

Application filed February 18, 1895. Serial No. 538,790. (No model.)

*To all whom it may concern:*

Be it known that I, GEORGE W. C. LOMB, a citizen of the United States, residing at Birmingham, in the county of Jefferson and State of Alabama, have invented certain new and useful Improvements in Electric Railways, of which the following is a full, clear, and exact description, reference being had to the accompanying drawings, forming part of this specification.

My invention relates to that class of electric railways in which the electric conductor is located at or under the ground, and it has more particular relation to that class of conduit systems in which the conductor is inclosed in an insulating tube or envelop and contact is had with the trolleys through contact-pieces embedded in the tube by the collapsing of the tube upon the passage of the trolley-wheel.

My improvements consist in a number of novel constructions and arrangements of parts, to be hereinafter more particularly pointed out and claimed.

The principal objects of my invention are to provide means for accurately guiding the trolley-wheel to prevent its displacement under the rocking motion of the car and the consequent wear and destruction of the conducting-tube; so to arrange the various parts that repairs may be made without interruption to travel no matter at how many places there may be breaks in the conduit; to provide perfect insulation for the various parts; to perfectly protect the trolley from the sleet, rain, or snow and the ammonia in street and salt used to melt the snow and ice; to construct the conducting-tube and arrange the contact-making pieces so that they may be readily and easily manufactured and will always insure perfect contact, and to obtain a perfectly-operating system by means strong and durable and easy to manufacture, the various details of which will be hereinafter pointed out.

In the drawings, Figure 1 is a cross-section of the conduit. Fig. 2 is a side elevation showing a portion of the car-truck and trolley-wheels. Fig. 3 is a cross-section of the conduit and road-bed. Fig. 4 is a cross-section of the conducting-tube, guide-rails, and the delivering trolley-wheel, showing the contact-pieces in contact with the main conductor. Fig. 5 is a similar section showing the return trolley-wheel. Fig. 6 is a perspective view of a portion of the guide-rails and the conducting-tube. Fig. 7 is a longitudinal section of the conducting-tube, showing the method of joining the sections. Fig. 8 is a similar view with the two sections joined. Fig. 9 is a cross-section of the conducting-tube, showing the manner of its construction. Fig. 10 is a bottom plan view of a portion of the conducting-tube. Fig. 11 is a longitudinal section in detail of a portion of the tube. Fig. 12 is a front view of one of the contact-making pieces, showing its method of construction. Fig. 13 is a central longitudinal section of the delivery trolley-wheel. Fig. 14 is a cross-section of the plow or trolley-arm.

My system can be readily arranged within any of the ordinary conduits in use for cable-railways, although of course the particular form of conduit is of no consequence. In the drawings I have illustrated a conduit quite similar to those in use for conducting the cable in cable-railways.

In a suitable trench in the middle of the road-bed iron yokes A are located, upon the upper surface of which the car-rails B B are placed and to the flanges at the central portion of which the slot-rails C C are bolted. Ties $a\ a$ are also provided at convenient distances, which bolt the yokes and slot-rails to the car-rails. At convenient distances brackets $b$ are bolted to the slot-rails. Suspended from these brackets are the rails D D, which serve both as hangers for the conducting-tube and for guide-rails for the trolley-wheels, as will be pointed out hereinafter. These rails D D are of any convenient length, preferably from thirty-two to thirty-six feet. They are bolted together and are provided with flanges $c$, extending inward at their base, upon which flanges the conducting tube or envelop is suspended.

The conducting-tube for the main conductor is made of rubber or other suitable elastic insulating material, the main portion forming a U-shaped trough $d$, the upper inner edges of which are beveled to receive the U-shaped cover $e$, also of the same material as the body of the envelop, while over the top of the envelop a strip of tar-paper $f$ or other suitable insulating material is secured.

E is the main copper conductor for the electric current. This is preferably secured to the under surface of the cover $e$ by staples $g$. (See Fig. 6.)

F are the contact-making pieces, which are either copper loops embedded in the base of the insulating-tube or they may be made as shown in Fig. 12, in which a copper staple H is passed through holes in the tube and connected on the other side of the envelop by the cross-piece $i$, which is riveted thereto. This form is probably preferable, as these contact-making pieces are more readily inserted in the envelop. To insure a more perfect contact with the trolley-wheel, I arrange these contact-making pieces in a double staggered row, as shown in Fig. 10, so that the trolley-wheel is at all times in contact with one or more of these pieces. In Fig. 10 I show both forms of these contact-pieces. The trolley-wheels are shown in Figs. 4 and 5, the wheel shown in Fig. 4 being the one which receives the current to transmit it to the car and that shown in Fig. 5 being the return-trolley. Both of these trolley-wheels are mounted on pivot-pins $k\ k$ and are provided with flanges $l\ l$, which extend out a considerable distance from the face of the wheel in order that they may perfectly embrace and ride on the guide-rails D D without any danger of being displaced therefrom by the rocking or jarring of the car. Each pair of these trolley-wheels is journaled in the rock-arm $m$, Fig. 2, which arm is pivoted at $p$ in the sides of a hood or casing $n$. I pivot each pair of the trolley-wheels in this rocking arm in order that no obstructions or jolting may throw either of the wheels out of its normal position, as might be the case if the trolley-wheels were pivoted rigidly to the casing. The internal construction of the receiving trolley-wheel is shown in Fig. 13. This wheel is made up of copper portions $r$ and $s$, separated by the insulating material $t\ t$, the end disks of copper $r\ r$ carrying the flanges $l$, which are bolted together by the bolts $u$ and are also insulated from the pivot-pin by the bushing $v$. The bolts $u$ are also insulated by the bushings $w$. The outer ends of the central copper portions $s$ of the wheel extend out beyond the side edges of the wheel, as shown at $y\ y$, and contact-springs $a'\ a'$, secured to the rocking hanger $m$, bear constantly against these ends $y\ y$.

G is the plow or trolley-arm which connects the trolley-wheels with the car. This plow is flat, in order to pass through the slot-rail, and a groove is formed in each edge of this arm, within which is located the insulated conducting-wires $b'\ c'$, on one side for the current to the car and on the other side for the return-current. When the line is in use, the trolley bears strongly against the lower surface of the conducting-tube, compressing the same and bringing the contact-making pieces into contact with the copper conductor E. The trolley is connected with the car, as shown in Fig. 2.

A' is a portion of the side frame of the car, and B' B' are cross pieces or rails extending across the body of the car from one side frame to the other.

C' is a bar provided with rollers D' D' at each end, which rollers ride on the rails B' B'. Two of these bars with rollers are provided, one on each side of the trolley-plow, (one only appearing in the front view thereof in Fig. 2,) and elliptical springs E' are bolted to these bars, which in turn are secured to brackets F', bolted to the plow, while G' is a brace, one on each side, to support and strengthen the connection and prevent the plow from swinging or twisting. From this construction it will be seen that normally the plow and its carriage will rest at the middle of the car, but if for any reason the car should leave the track, or the slot-rails not be at the middle of track, the carriage will slide or roll to one side or the other within the limits of the width of the car without any danger of displacing the plow from the slot-rail or damaging in any way the trolley connection underground, and that the springs E' will at all times hold the trolley-wheels on their track. The course of the current is then through the portion $s$ of the trolley-wheel to the contact-springs $a'$, thence up the wire $b'$, as shown by the dotted line, Fig. 2, through the motor on the car and down through the wire $c'$, through a corresponding spring contact-piece $a'$ to the flanges $l$ and outer portion of the return-trolley wheel. This return-trolley wheel, as shown in Fig. 5, is cut away at the central portion $f'$, so as always to be out of contact with the conducting-tube. From the outer portion of this return-trolley the current passes to the guide-rail.

As described thus far, the conducting-envelop and the main copper conductor E might be of one continuous piece, but in that event, should any breaks occur, the entire line would be stopped. To overcome this difficulty, the conducting-tube and the copper conductor are made in sections of any suitable length to correspond with the guide-rails and hanger D D. The outer ends of the elastic conducting-tube extending slightly beyond the ends of the guide-rail, as shown in Fig. 7, and the ends of the conductor E E being beveled, as shown at $g'$, so that when the two edges of the guide-rail are brought together, as shown in Fig. 8, the ends of the conducting-tube will be slightly compressed and the edges of the conductor will pass by each other. I thus construct these parts so that contact will still be had under any displacement of the guide-rails, due to expansion, contraction, or jars.

In order that no break or damage to any one or any number of the various sections may cause any interruption to travel, each one of the sections is provided with wires $h'$ and $i'$.

These wires are properly insulated, and the one, as $h'$, is connected with the conductor E through a suitable opening $k'$ between the guide-rails, and the other wire $i'$ is connected with the guide-rails themselves.

To supply a continuous current to each of the sections, I provide a main supply-cable L from the power-house and a main return-cable M, each of the feed-wires $h'$ being connected with this main supply-cable and each of the return outlet-wires $i'$ being connected with the return-cable M. Both the feed and outlet wires and the main cables are of course properly insulated, and the main-cables are suspended at any convenient position, but preferably by brackets N, bolted to one of the slot-rails. With this construction it will be manifest that one or a dozen of the various sections may be out of order and in need of repairs and that still the system will be in working order, for the impetus given each car will be sufficient to carry it over one of the sections, when the current for moving the car will be given by the next set of feed-wires.

P is a shield bolted to the guide-rails, which serves as a cover and protection to the trolley-wheels and conductor. I form the cover or upper portion of the conducting-tube U-shaped in order to leave a space $m'$ between the guide-rails and the staples which hold the copper conductor, so that as the guide-rails wear away there may be ample air-space to prevent any improper contact, and as a further guard I provide the insulating-strip $f$. A similar space $n$, Fig. 4, is left over the feed-wire $h'$.

The advantages of my conduit system over the older arrangements will be manifest.

While it is old to inclose the main conducting-wire in an envelop, the points of practical construction of this envelop have not been ordinarily looked after, and while in theory the older arrangements have been useful it has been so difficult and expensive to construct the envelop that such systems have not gone into use. My envelop, however, it will be seen, can readily and easily be manufactured, and the contact-pieces can be easily inserted, and if any of them should become damaged can be easily replaced.

In most of the systems of the class under consideration the trolley-wheels have been arranged to ride directly on the envelop or tube and to be guided by it; but, it is manifest, in use this tube would almost at once be destroyed and cut to pieces by the trolley-wheel under the jars and jolts of the car. With my improvements, however, the trolley-wheels are absolutely and firmly guided by a steel-rail track, and the twists and strains on the trolley can in no way injuriously affect the conducting-tube. Moreover, it has been customary in this class of conduits to employ only a single series of contact-pieces, and as a result the trolley is not always in contact with the conductor. The circuit is therefore made and broken and there is a constant and continual sparking and wear on the trolley-wheel, envelop, and contact-making pieces not met with in my construction.

I am aware that heretofore it has been proposed to sectionalize the system, so that the various sections may be removed for repairs without interrupting travel and to supply each section by a feed-wire from the main conductor. Where such an arrangement has been employed, however, it has been proposed to return the current through the slot-rail or the ground. In my system, however, the return-circuit is also sectionalized by means of the main return-cable and the outlet-wires $i'$ therefor, the slot-rails being carefully insulated from the brackets $b$ by the insulating-strip $m'$ between each bracket and the guide-rails. Where the return is had through the slot-rails or the track, one of the great objections to this arrangement is that the current is very apt to leave the rails and follow the neighboring water-pipes and the like, and the electrochemical action incident thereto soon honeycombs and destroys the joints. All of this is avoided by my system. It will be further noticed that each section of the main conductor E is beveled at the ends and overlaps, so that there is a continuous electrical path through the conductor E. In older systems of this nature the various sections of the main conductor have not been joined, but have been separated and insulated from each other. The result of this is that as the trolley-wheel passes from one section to the next there is a make and break of the current and consequent sparking and wear, which burns and destroys the envelop and other parts of the system. Moreover, in such older constructions the entire current has to be carried by the main cable, while in my construction the conductor E also serves as a pathway for the main current, and as a result the feed-wires do not have to be so large and there is no sparking or wear at the section-joints and the resistance is also much reduced. To guard against any leakage at these section-joints, I prefer to cement the ends of the inclosing rubber envelop with proper rubber cement, although this may or may not be found necessary in all cases.

It will be understood that in describing my system and the particular features of construction which I have called attention to that there are certain features that are of course not essential and to which I do not wish to be limited. For instance, I have shown the contact-pieces F as loops of copper. While I prefer this construction, simple rivets of copper or other suitable material could be used as well. I have shown an envelop for my main conductor E as a tube with an air-space therein. The essential feature is that the contact-pieces should not be normally in contact with the main conductor and, if desired, instead of a tube a solid mass of rubber or other suitable elastic insulating material could be employed, with merely openings left directly over the contact-pieces. Moreover, I have shown a construction in which the trolley-wheels bear underneath the inclosing envelop and in which the track, which serves as a guide for the trolley-wheels, acts also as a hanger or a supporting means for the conductor. This position of parts I do not consider essential, nor would I wish to be limited thereto. The trolley could be readily arranged to ride on the side or on the top of the conductor and the hanger or means of supporting the conductor could be separate from the track and a separate track to guide the trolley-wheel provided. What is essential is that there shall be some guiding means for the trolley apart from the conductor itself or its inclosing envelop.

Having thus described my invention, what I claim, and desire to secure by Letters Patent, is—

1. In an electric railway, the combination, with an electric conductor and insulating-envelop, inclosing same with contact-making pieces therefor, of a continuous hanger for holding said conductor and its insulating-envelop, and trolley-wheel having a middle portion of conducting material, in contact with said envelop, and provided with flanges of insulated material embracing said hanger riding upon and guided thereby, substantially as shown and described.

2. In an electric railway, a combined track for the trolley, and hanger for the conductor, said track and hanger consisting of plates bolted together to form a U-shaped trough, with flanges extending inwardly, electric conducting-envelop supported on said flanges and flanged trolley-wheel having a middle portion of conducting material with its flanges of insulated material guided by and running on the outside of said hanger, substantially as shown and described.

3. In an electric railway, the combination of a series of similar plates bolted together to form a U-shaped trough and placed in sections end to end, flanges extending inwardly therefrom, electric conducting-envelop somewhat longer than said sections, supported on said flanges, and flanged trolley-wheel having a middle portion of conducting material with its flanges of insulated material guided by and running on the outside of said hanger, substantially as shown and described.

4. In an electric railway, an insulating-envelop for the electric conductor, and a double series of contact-pieces therefor arranged in a staggered row, said contact-pieces being loops of copper embedded in said envelop with two of their parallel sides extending lengthwise along the interior and exterior surface of said envelop, substantially as shown and described.

5. In an electric railway, contact-making pieces for the insulating-envelop for the electric conductor, consisting of staples with their ends passing through the envelop, and cross-pieces riveted or otherwise secured to said ends along the opposite surface of said envelop, substantially as shown and described.

6. In an electric railway, the combination, with a hanger and insulating-envelop for the conductor supported thereby, of a trolley provided with a pair of flanged trolley-wheels, one in contact with said insulating-envelop with its flanges embracing said hanger, the other cut away at the central portion so as to be out of contact with said envelop but with its flanges embracing said hanger, substantially as shown and described.

7. In an electric railway, in combination, with an electric conductor, insulating-envelop, and contact-pieces therefor, a trolley-wheel constructed of alternate sections of copper and insulating material, substantially as shown, with insulated bolts to fasten said sections together, with copper rim extending beyond the side faces of the wheel, with spring contact-pieces bearing against same, substantially as shown and described.

8. In an electric railway, the combination, with a hanger and insulating-envelop for the conductor supported thereby, of a trolley provided with a pair of flanged trolley-wheels, one in contact with said insulating-envelop with its flanges embracing said hanger, the other cut away at the central portion so as to be out of contact with said envelop but with its flanges embracing said hanger, said trolley-wheels being journaled in rock-arms pivoted to the trolley-casing, substantially as shown and described.

9. In an electric railway, an electric conductor, and insulating-envelop for same, with continuous hanger to support said envelop, all of said parts being made in sections of convenient length, with the ends of said conductor overlapping, two main cables, one for the supply, the other for the return current, with feed and outlet wires from said supply-cable to each section of the conductor, and from the return-cable to each section of the hanger, substantially as and for the purpose described.

GEORGE W. C. LOMB.

Witnesses:
GEORGE HEIDMAN,
HARVEY GATES EDWARDS.